United States Patent
Kim et al.

(10) Patent No.: US 11,869,458 B2
(45) Date of Patent: *Jan. 9, 2024

(54) DISPLAY DEVICE, ELECTRONIC DEVICE HAVING DISPLAY DEVICE AND METHOD OF OPERATING THE SAME

(71) Applicant: Samsung Display Co., Ltd., Yongin-si (KR)

(72) Inventors: Myeong-Su Kim, Hwaseong-si (KR); Su-Hyeong Park, Gyeongju-si (KR); Ho-Yong Jung, Seongnam-si (KR); Jae-Ho Choi, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 19 days.

This patent is subject to a terminal disclaimer.

(21) Appl. No.: 17/688,019

(22) Filed: Mar. 7, 2022

(65) Prior Publication Data
US 2022/0189434 A1 Jun. 16, 2022

Related U.S. Application Data

(60) Continuation of application No. 16/740,842, filed on Jan. 13, 2020, now Pat. No. 11,270,667, which is a
(Continued)

(30) Foreign Application Priority Data

May 21, 2014 (KR) .......................... 10-2014-0060967

(51) Int. Cl.
*G06T 1/20* (2006.01)
*G09G 5/18* (2006.01)
(Continued)

(52) U.S. Cl.
CPC .................. *G09G 5/18* (2013.01); *G06T 1/20* (2013.01); *G09G 3/2096* (2013.01); *G09G 5/10* (2013.01);
(Continued)

(58) Field of Classification Search
CPC .......... G09G 5/18; G09G 3/2096; G09G 5/10; G09G 2320/0247; G09G 2320/103;
(Continued)

(56) References Cited

U.S. PATENT DOCUMENTS 5,745,909 A 4/1998 Perlman et al.
5,844,535 A 12/1998 Itoh et al.
(Continued)

FOREIGN PATENT DOCUMENTS

CN 102542980 A 7/2012
CN 103680382 A 3/2014
(Continued)

OTHER PUBLICATIONS

Korean Notice of Allowance for Application No. 10-2014-0060967 dated Dec. 28, 2020 enumerating the above listed references.
(Continued)

*Primary Examiner* — Amy Onyekaba
(74) *Attorney, Agent, or Firm* — CANTOR COLBURN LLP

(57) ABSTRACT

A display device includes a display panel including a plurality of pixels, a scan driving unit configured to provide a scan signal to the pixels, a data driving unit configured to provide a data signal to the pixels, and a controller configured to provide driving frequency information to a processor, which transfers image data with a driving frequency determined based on the driving frequency information to the display device, to receive the image data with the driving frequency from the processor, and to control the scan driving
(Continued)

unit and the data driving unit to drive the display panel with the driving frequency.

15 Claims, 10 Drawing Sheets

Related U.S. Application Data division of application No. 14/583,728, filed on Dec. 28, 2014, now Pat. No. 10,565,963.

(51) Int. Cl.
  *G09G 3/20* (2006.01)
  *G09G 5/10* (2006.01)
(52) U.S. Cl.
  CPC .......... *G09G 2320/0247* (2013.01); *G09G 2320/103* (2013.01); *G09G 2330/021* (2013.01); *G09G 2340/0435* (2013.01); *G09G 2360/16* (2013.01); *G09G 2370/08* (2013.01)
(58) Field of Classification Search
  CPC ..... G09G 2330/021; G09G 2340/0435; G09G 2360/16; G09G 2370/08; G06T 1/20
  See application file for complete search history.

(56) References Cited

U.S. PATENT DOCUMENTS

| | | | | |
|---|---|---|---|---|
| 6,028,587 A * | 2/2000 | Igari | ........ | G09G 3/3674 345/597 |
| 6,154,225 A * | 11/2000 | Kou | ........ | H04N 9/641 348/E5.134 |
| 6,924,796 B1 * | 8/2005 | Someya | ........ | G09G 5/008 345/98 |
| 7,023,470 B2 * | 4/2006 | Braun | ........ | H04N 17/04 348/184 |
| 8,026,919 B2 * | 9/2011 | Aoki | ........ | G09G 5/399 345/503 |
| 8,593,493 B2 * | 11/2013 | Ohishi | ........ | G09G 3/3648 345/99 |
| 8,860,639 B2 * | 10/2014 | Kim | ........ | G09G 3/3233 345/82 |
| 8,884,938 B2 * | 11/2014 | Hsu | ........ | G09G 3/20 345/204 |
| 9,111,509 B2 * | 8/2015 | Kim | ........ | G09G 3/3688 |
| 9,307,187 B2 * | 4/2016 | Izumi | ........ | H04N 7/013 |
| 9,613,554 B2 | 4/2017 | Jang et al. | | |
| 9,754,343 B2 | 9/2017 | Ko et al. | | |
| 10,345,937 B2 | 7/2019 | Ichihara | | |
| 2002/0140652 A1 * | 10/2002 | Suzuki | ........ | G09G 3/3611 345/87 |
| 2004/0008281 A1 * | 1/2004 | Jeffrey | ........ | H04N 5/21 348/E5.077 |
| 2004/0113879 A1 * | 6/2004 | Sekiguchi | ........ | G09G 3/3648 345/94 |
| 2004/0150605 A1 * | 8/2004 | Arimoto | ........ | G09G 5/008 345/100 |
| 2005/0068268 A1 * | 3/2005 | Song | ........ | G09G 5/393 345/60 |
| 2006/0007194 A1 * | 1/2006 | Verschueren | ........ | G09G 3/3611 345/204 |
| 2006/0077290 A1 * | 4/2006 | Chung | ........ | H04N 21/440281 348/E7.003 |
| 2006/0256051 A1 | 11/2006 | Lee et al. | | |
| 2007/0229418 A1 * | 10/2007 | Yun | ........ | G09G 3/2092 345/87 |
| 2007/0296668 A1 * | 12/2007 | Kim | ........ | G09G 3/3611 345/89 |
| 2008/0284719 A1 * | 11/2008 | Yoshida | ........ | G02F 1/13392 349/37 |
| 2008/0291326 A1 * | 11/2008 | Shishido | ........ | G09G 3/3611 348/790 |
| 2009/0109247 A1 * | 4/2009 | Kimura | ........ | G09G 3/3688 345/690 |
| 2009/0122054 A1 * | 5/2009 | Lee | ........ | G09G 3/3614 345/214 |
| 2009/0284499 A1 * | 11/2009 | Kim | ........ | G09G 3/20 345/204 |
| 2009/0322661 A1 * | 12/2009 | Bae | ........ | G09G 3/3648 345/87 |
| 2010/0039456 A1 * | 2/2010 | Um | ........ | G09G 3/3426 345/589 |
| 2010/0053228 A1 * | 3/2010 | Yeo | ........ | G09G 3/3406 345/690 |
| 2010/0134533 A1 * | 6/2010 | Moon | ........ | G09G 3/3611 345/88 |
| 2010/0302214 A1 * | 12/2010 | Kim | ........ | H04N 13/398 345/204 |
| 2011/0227961 A1 * | 9/2011 | Kikuta | ........ | G09G 3/3225 345/690 |
| 2012/0032993 A1 * | 2/2012 | Lee | ........ | G09G 3/342 345/208 |
| 2012/0062552 A1 * | 3/2012 | Bae | ........ | H04N 13/139 345/428 |
| 2013/0038621 A1 * | 2/2013 | Choi | ........ | G06T 1/20 345/589 |
| 2013/0088660 A1 * | 4/2013 | Kaneko | ........ | H01L 27/15 257/59 |
| 2013/0106876 A1 * | 5/2013 | Lee | ........ | G06F 13/14 345/520 |
| 2013/0106895 A1 * | 5/2013 | Jeong | ........ | G09G 3/3406 345/589 |
| 2013/0113811 A1 * | 5/2013 | Choi | ........ | G09G 3/3648 345/212 |
| 2013/0215094 A1 * | 8/2013 | Choi | ........ | G09G 3/2025 345/211 |
| 2013/0278569 A1 * | 10/2013 | Choi | ........ | G09G 5/003 345/204 |
| 2014/0015820 A1 * | 1/2014 | Choi | ........ | G09G 3/3614 345/204 |
| 2014/0204104 A1 | 7/2014 | Jang et al. | | |
| 2015/0049274 A1 * | 2/2015 | Kim | ........ | G09G 3/3614 349/41 |
| 2015/0287375 A1 * | 10/2015 | Tanaka | ........ | G09G 3/3677 345/212 |
| 2015/0310814 A1 * | 10/2015 | Umekida | ........ | H04N 21/4402 345/88 |

FOREIGN PATENT DOCUMENTS

| | | |
|---|---|---|
| JP | 2007286519 A | 11/2007 |
| KR | 1020090056193 A | 6/2009 |
| KR | 1020120015685 A | 2/2012 |
| KR | 1020130018493 A | 2/2013 |
| KR | 1020130066076 A | 6/2013 |
| KR | 1020130131162 A | 12/2013 |

OTHER PUBLICATIONS

Korean Office Action for Application No. 10-2014-0060967 dated May 29, 2020 Enumerating the above listed reference cited in the Korean Office Action.

Chinese Office Action for Application No. 201510262413.1 dated Jun. 4, 2019 enumerating the above references listed in the Chinese Office Action.

\* cited by examiner

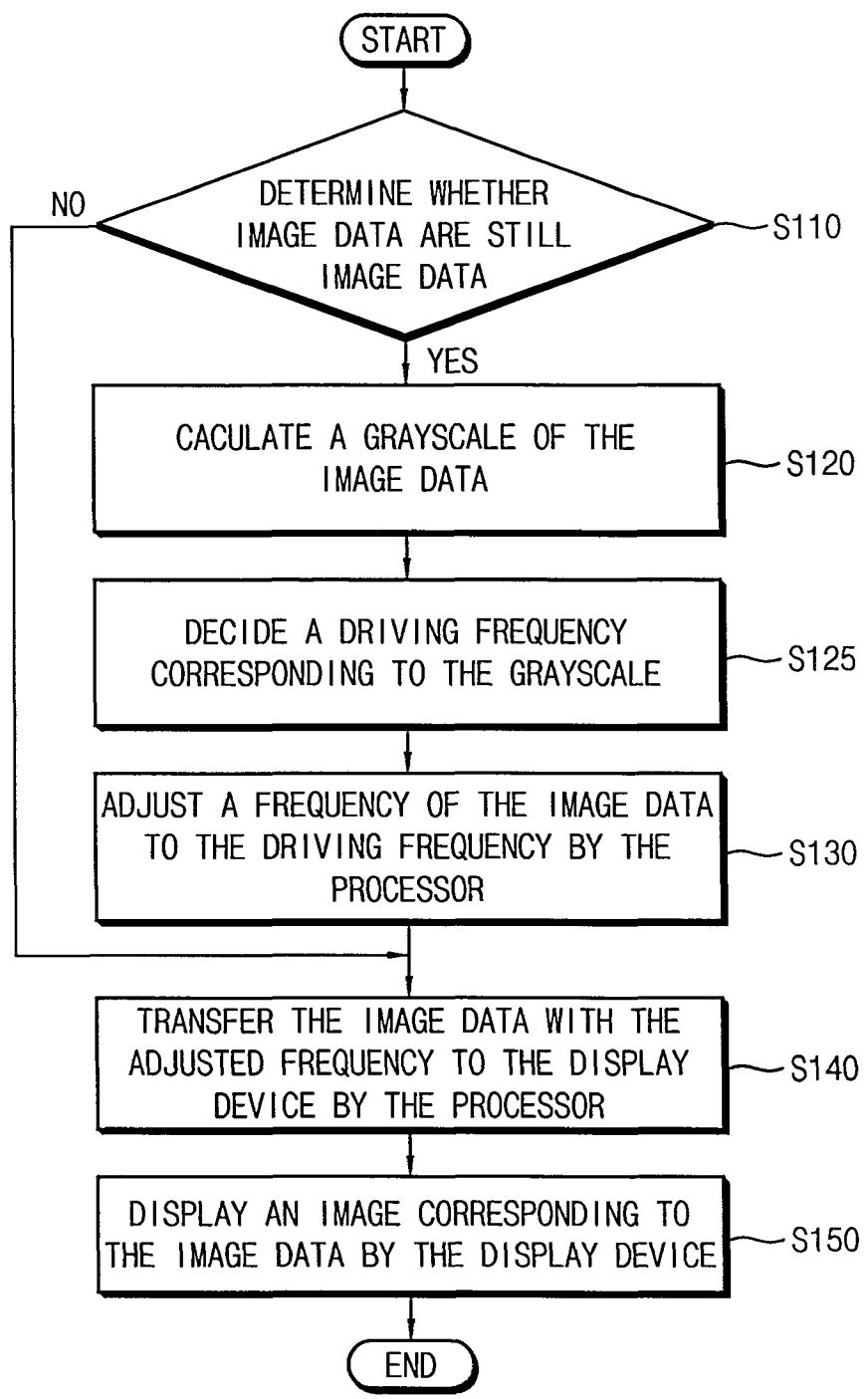

DISPLAY DEVICE, ELECTRONIC DEVICE HAVING DISPLAY DEVICE AND METHOD OF OPERATING THE SAME

This application is a continuation of U.S. patent application Ser. No. 16/740,842, filed on Jan. 13, 2020, which is a divisional of U.S. patent application Ser. No. 14/583,728, filed on Dec. 28, 2014, which claims priority to Korean patent Application No. 10-2014-0060967 filed on May 21, 2014, and all the benefits accruing therefrom under 35 U.S.C. § 119, the content of which in its entirety is herein incorporated by reference.

BACKGROUND

1. Field

Exemplary embodiments of the invention relate to a display device. More particularly, exemplary embodiments of the invention relate to a display device, an electronic device including the display device, and a method of operating the display device.

2. Description of the Related Art

Generally, an image displayed by a display device is classified into a still image and a moving image. The still image is displayed when the display device displays several frames per second, and data of each frame are the same as each other, for example. The moving image is displayed when the display device displays several frames per second, and data of each frame are different from each other, for example. When the still image is displayed, the display device receives the image data from a processor for every frame to display the still image, thereby increasing power consumption.

Recently, a method of operating an electronic device including the display device is developed to reduce the power consumption. In such a method, a frame memory is used to the display device to store the image data of the still image, and the stored image data are provided to the display panel while the still image is displayed. This is referred to as a pixel self-refresh ("PSR") technique. In the PSR technique, the image data are not transmitted from the processor while the still image is displayed such that the processor is not activated, thereby reducing the power consumption. In another method to reduce the power consumption, the display device without the frame memory may generate control signals corresponding to the image data with a low frequency when the image data are still image data.

SUMMARY

In the PSR technique, power is consumed in the frame memory and manufacturing cost may also increase when the frame memory is added to the display device. In a method, where the display device without the additional frame memory generates control signals corresponding to the image data with a low frequency when the image data are still image data, it may be difficult to reduce the driving frequency between the processor and the display device.

Exemplary embodiments provide a display device with reduced power consumption without additional manufacturing cost.

Exemplary embodiments provide an electronic device including the display device and the processor.

Exemplary embodiments provide a method of operating the electronic device.

According to some exemplary embodiments, the display device may include a display panel including a plurality of pixels, a scan driving unit configured to provide a scan signal to the pixels, a data driving unit configured to provide a data signal to the pixels, and a controller configured to provide driving frequency information to a processor, which transfers image data with a driving frequency determined based on the driving frequency information to the display device, to receive the image data with the driving frequency from the processor, and to control the scan driving unit and the data driving unit to drive the display panel with the driving frequency.

In exemplary embodiments, the controller may include an image data receiving unit configured to receive the image data from the processor, a still image determining unit configured to determine whether the image data are still image data, a driving frequency deciding unit configured to decide the driving frequency by analyzing the image data when the image data are the still image data, a frequency information providing unit configured to provide the driving frequency information corresponding to the driving frequency to the processor, and a timing controller configured to generate control signals based on the image data, and to provide the control signals to the scan driving unit and the data driving unit.

In exemplary embodiments, the driving frequency deciding unit may calculate a grayscale of the image data, and decide the driving frequency based on the grayscale of the image data using a flicker profile of the display device.

In exemplary embodiments, the controller may include an image data receiving unit configured to receive the image data from the processor, a driving frequency deciding unit configured to decide the driving frequency by analyzing the image data, a frequency information providing unit configured to provide the driving frequency information corresponding to the driving frequency to the processor, and a timing controller configured to generate control signals based on the image data, and to provide the control signals to the scan driving unit and the data driving unit.

In exemplary embodiments, the controller may include a profile providing unit configured to provide a flicker profile of the display device as the driving frequency information to the processor, an image data receiving unit configured to receive the image data with the driving frequency determined based on the flicker profile from the processor, and a timing controller configured to generate control signals based on the image data, and to provide the control signals to the scan driving unit and the data driving unit.

According to some exemplary embodiments, an electronic device may include a display device configured to receive image data from a processor, to display an image corresponding to the image data, and to provide driving frequency information to the processor, and the processor configured to receive the driving frequency information, to adjust a frequency of the image data based on the driving frequency information, and to transfer the image data with the adjusted frequency to the display device.

In exemplary embodiments, the display device may include a display panel including a plurality of pixels, a scan driving unit configured to provide a scan signal to the pixels, a data driving unit configured to provide a data signal to the pixels, and a controller configured to provide the driving frequency information to the processor, to receive the image data with the adjusted frequency from the processor, and to control the scan driving unit and the data driving unit to drive the display panel with the adjusted frequency.

In exemplary embodiments, the controller may include an image data receiving unit configured to receive the image data, a still image determining unit configured to determine whether the image data are still image data, a driving frequency deciding unit configured to decide a driving frequency by analyzing the image data when the image data are the still image data, a frequency information providing unit configured to provide the decided driving frequency as the driving frequency information to the processor, and a timing controller configured to generate control signals based on the image data with the adjusted frequency, and to provide the control signals to the scan driving unit and the data driving unit. In such an embodiment, the processor may include a frequency information receiving unit configured to receive the decided driving frequency as the driving frequency information from the frequency information providing unit, and an image data transferring unit configured to adjust the frequency of the image data to the decided driving frequency, and to transfer the image data with the decided driving frequency to the image data receiving unit.

In exemplary embodiments, the driving frequency deciding unit may calculate a grayscale of the image data, and decides a driving frequency corresponding to the grayscale of the image data as the decided driving frequency using a flicker profile of the display device.

In exemplary embodiments, the image data transferring unit may adjust the frequency of the image data to the decided driving frequency by masking the image data.

In exemplary embodiments, the processor may further include an image data memory configured to store the image data, and the image data transferring unit may adjust the frequency of the image data to the decided driving frequency using the image data memory.

In exemplary embodiments, the frequency information providing unit may provide the decided driving frequency to the frequency information receiving unit when the driving frequency is changed.

In exemplary embodiments, the frequency information receiving unit may periodically send a driving frequency providing request to the frequency information providing unit, and the frequency information providing unit may provide the decided driving frequency to the frequency information receiving unit in response to the driving frequency providing request.

In exemplary embodiments, the controller may include an image data receiving unit configured to receive the image data, a driving frequency deciding unit configured to decide a driving frequency by analyzing the image data, a frequency information providing unit configured to provide the decided driving frequency as the driving frequency information to the processor, a timing controller configured to generate control signals based on the image data with the adjusted frequency, and to provide the control signals to the scan driving unit and the data driving unit. In such an embodiment, the processor may include a frequency information receiving unit configured to receive the decided driving frequency as the driving frequency information from the frequency information providing unit, a still image determining unit configured to determine whether the image data are still image data, and an image data transferring unit configured to adjust the frequency of the image data to the decided driving frequency when the image data are the still image data, and to transfer the image data with the decided driving frequency to the image data receiving unit.

In exemplary embodiments, the controller may include a profile providing unit configured to provide a flicker profile of the display device as the driving frequency information, an image data receiving unit configured to receive the image data with the adjusted frequency from the processor, and a timing controller configured to generate control signals based on the image data with the adjusted frequency, and to provide the control signals to the scan driving unit and the data driving unit. In such an embodiment, the processor may include a profile receiving unit configured to receive the flicker profile corresponding to the driving frequency information from the profile providing unit, a still image determining unit configured to determine whether the image data are still image data, a driving frequency deciding unit configured to calculate a grayscale of the image data when the image data are the still image data, and to decide a driving frequency corresponding to the grayscale of the image data using the flicker profile, and an image data transferring unit configured to adjust the frequency of the image data to the decided driving frequency, and to transfer the image data with the decided driving frequency as the image data with the adjusted frequency to the image data receiving unit.

In exemplary embodiments, the profile providing unit may provide the flicker profile to the profile receiving unit when the display device is initialized.

In exemplary embodiments, the display device may include a display panel including a plurality of pixels, and a plurality of integration driving units configured to provide the driving frequency information to the processor, to receive the image data with the adjusted frequency from the processor, and to drive the display panel with the adjusted frequency.

In exemplary embodiments, the processor may receive the driving frequency information from the integration driving units, and adjusts the frequency of the image data to the highest driving frequency among a plurality of driving frequencies corresponding to the driving frequency information from the integration driving units, respectively.

According to some exemplary embodiments, a method of operating an electronic device including a processor and a display device may include determining whether image data are still image data, calculating a grayscale of the image data when the image data are the still image data, deciding a driving frequency corresponding to the gray scale using a flicker profile of the display device, adjusting a frequency of the image data based on the decided driving frequency using the processor, transferring the image data with the adjusted frequency from the processor to the display device, and displaying an image corresponding to the image data using the display device.

In exemplary embodiments, the frequency of the image data may be adjusted to the driving frequency by masking the image data.

In such embodiments, where the display device provides driving frequency information to the processor such that the processor transfers image data with a driving frequency determined based on the driving frequency information, the display device may be driven at a low frequency, thereby reducing the power consumption. In such embodiments, where the display device does not include a frame memory that stores the image data of the still image, the manufacturing cost of the display device may be reduced.

In such embodiments, the electronic device may reduce the power consumption by performing a low frequency driving between the processor and the display device.

In such embodiment, a method of operating an electronic device may effectively prevent the flicker and reduce the power consumption by performing a low frequency driving using a flicker profile.

BRIEF DESCRIPTION OF THE DRAWINGS

The above and other features of the invention will become more apparent by describing in detailed exemplary embodiments thereof with reference to the accompanying drawings, in which:

FIG. 11 is a flow chart illustrating an exemplary embodiment of a method of operating an electronic device according to the invention.

DESCRIPTION OF EMBODIMENTS

Figure 1:
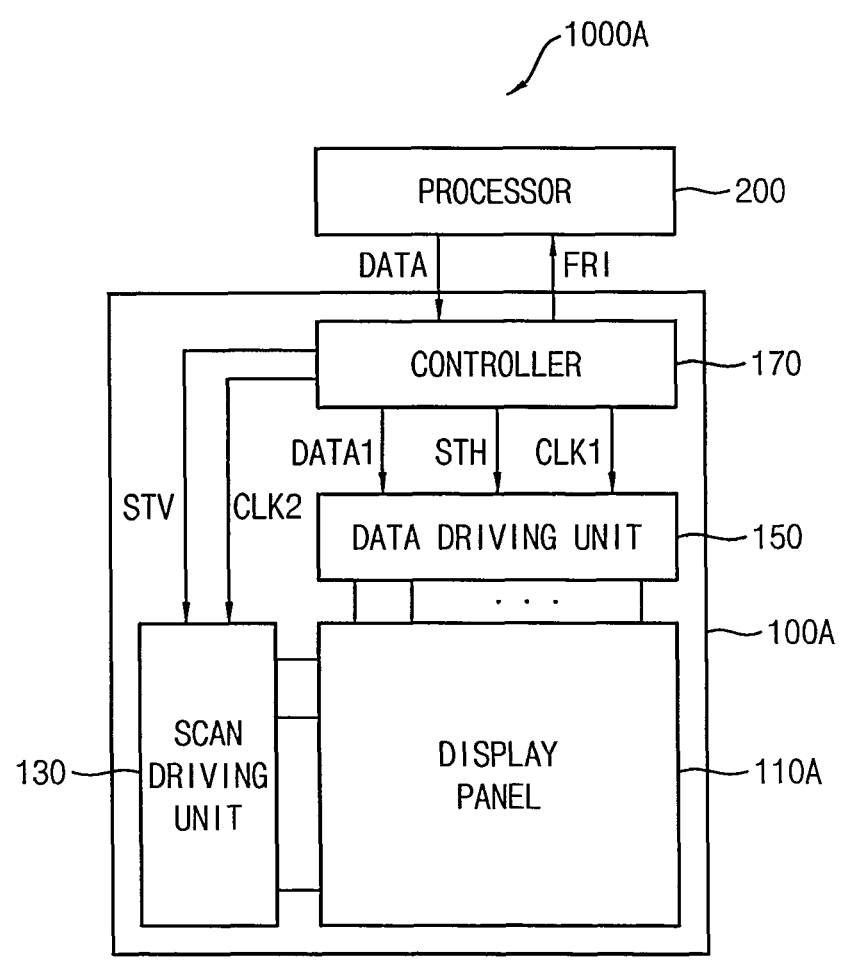
FIG. 1 is a block diagram illustrating an exemplary embodiment of an electronic device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

FIG. 1 is a block diagram illustrating an exemplary embodiment of an electronic device according to the invention.

Referring to FIG. 1, an exemplary embodiment of an electronic device 1000A may include a display device 100A and a processor 200.

The display device 100A may include a display panel 110A, a scan driving unit (e.g., a scan driver) 130, a data driving unit (e.g., a data driver) 150, and a controller 170. In an exemplary embodiment, the display device 100A may provide driving frequency information FRI to the processor 200, receive image data DATA with the driving frequency determined based on the driving frequency information FRI from the processor 200, and display an image corresponding to the image data DATA.

The display panel 110A may include a plurality of pixels to display image. The display panel 110A may be coupled to the scan driving unit 130 via scan lines, and may be coupled to the data driving unit 150 via data lines. The display panel 110A may include the pixels that connected to the scan-lines and the data-lines. In one exemplary embodiment, for example, the pixels are arranged at locations corresponding to crossing points of the scan-lines and the data-lines.

The scan driving unit 130 may provide a scan signal to the pixels of the display panel 110A via the scan-lines.

The data driving unit 150 may provide a data signal to the pixels of the display panel 110A via the data-lines.

The controller 170 may provide the driving frequency information FRI to the processor 200, receive the image data DATA with the driving frequency determined based on the driving frequency information FRI from the processor 200, and control the scan driving unit 130 and the data driving unit 150 to drive the display panel 110A with an adjusted frequency, that is, the driving frequency adjusted or determined based on the driving frequency information FRI.

Thus, the controller 170 may provide the driving frequency information FRI based on the size or type of the display device 100A, such that the controller 170 receive the image data DATA with the adjusted driving frequency corresponding to the display device 100A from the processor 200. In an exemplary embodiment, the driving frequency information FRI includes various kinds of information to decide or determined the driving frequency. In one exemplary embodiment, for example, the driving frequency information FRI may include a flicker profile that involves driving frequencies corresponding to grayscale of the image data DATA to effectively prevent the flicker. In another exemplary embodiment, the driving frequency information FRI may include the driving frequency determined based on the grayscale of the image data DATA and the flicker profile.

The controller 170 may control the scan driving unit 130 and the data driving unit 150 by providing the control signals corresponding to the image data DATA to the scan driving unit 130 and the data driving unit 150. In one exemplary embodiment, for example, the controller 170 may generate a data signal DATA1, a first clock signal CLK1 and a horizontal start signal STH, and may provide the data signal DATA1, the first clock signal CLK1 and the horizontal start signal STH to the data driving unit 150. The controller 170 may generate a second clock signal CLK2 and a vertical start signal STV, and may provide the second clock signal CLK2 and the vertical start signal STV to the scan driving unit 130.

In such an embodiment, the display device 100A may further include a power supply unit (e.g., a power supplier) that supplies the power to the pixels.

The processor 200 may receive the driving frequency information FRI, adjust a frequency of the image data DATA based on the driving frequency information FRI, and transfer the image data DATA to the display device 100A. In one exemplary embodiment, for example, when the image data DATA are the still image data, the processor 200 may adjust the frequency of the image data DATA corresponding to the driving frequency information FRI that is received from the display device 100A, and may transfer the image data DATA with a low frequency (e.g., a frequency lower than a normal driving frequency when the image data DATA is not the still image data) to the display device 100A. The processor 200 may include various kinds of devices that process the image data DATA and transfer the image data DATA to the display device 100A. In one exemplary embodiment, for example, the processor 200 may be an application processor ("AP"), a micro control unit ("MCU"), etc.

Therefore, in an exemplary embodiment, the electronic device 1000A includes the display device 100A that provides the driving frequency information FRI and the processor 200 that adjusts the frequency of the image data DATA based on the driving frequency information FRI, thereby performing a low frequency driving between the processor 200 and the display device 100A and reducing the power consumption. In such an embodiment, the display device 100A may not include a frame memory that stores the image data, thereby reducing manufacturing cost.

Figure 2:
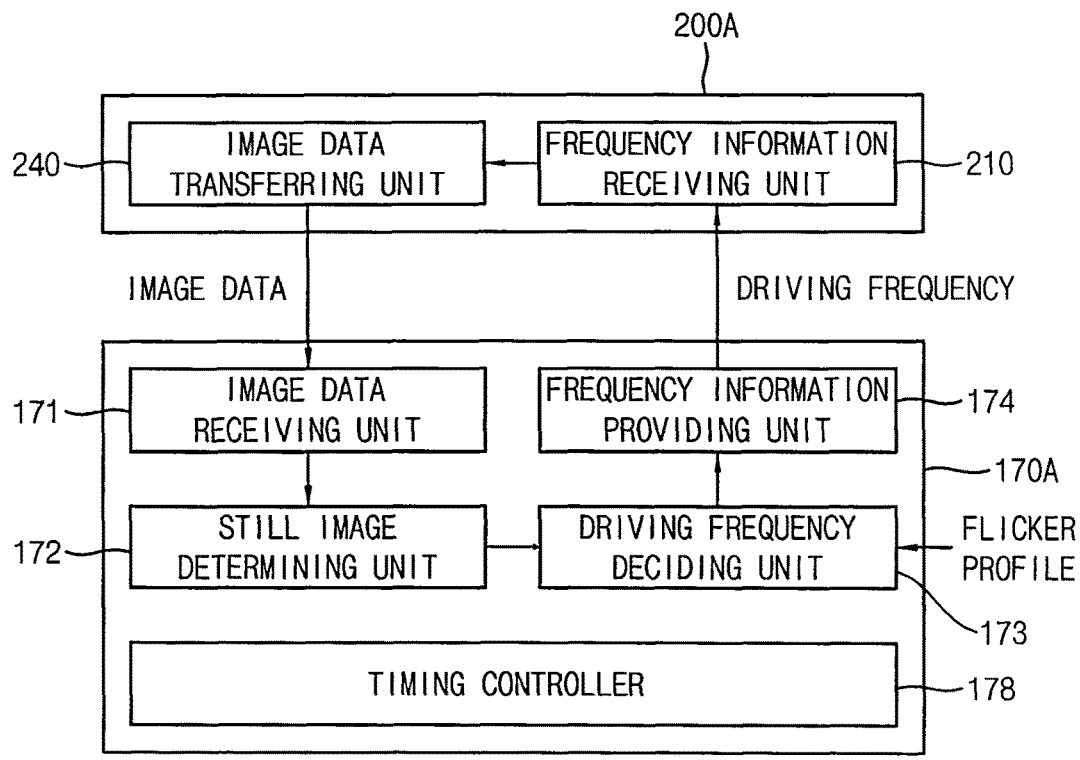
FIG. 2 is a block diagram illustrating an exemplary embodiment of a processor and a controller of a display device of the electronic device of FIG. 1.

FIG. 2 is a block diagram illustrating an exemplary embodiment of a processor and a controller of a display device of the electronic device of FIG. 1.

Referring to FIG. 2, in an exemplary embodiment, a controller 170A of the display device may provide the driving frequency to the processor 200A as the driving frequency information FRI, such that the processor 200A may adjust a frequency of the image data based on the driving frequency.

In an exemplary embodiment, the controller 170A may include an image data receiving unit 171, a still image determining unit 172, a driving frequency deciding unit 173, a frequency information providing unit 174 and a timing controller 178. In one exemplary embodiment, for example, the controller 170A may a circuit (e.g., an integrated circuit such as a data processor, etc.), and units of the controller 170A may be a portion of the controller 170A that perform predetermined operations therein.

In such an embodiment, the image data receiving unit 171 may receive the image data from an image data transferring unit 240. The image data receiving unit 171 may transfer the image data to the still image determining unit 172 to decide the driving frequency between the processor 200A and display device. In such an embodiment, the image data receiving unit 171 may transfer the image data to the timing controller 178 to provide control signals corresponding to the image data to the scan driving unit and the data driving unit.

The still image determining unit 172 may determine whether the image data from the image data receiving unit 171 are still image data. In one exemplary embodiment, for example, the still image determining unit 172 may analyze the frame data of the image data. When data of each frame are not changed during predetermined frame periods, then the image data are determined to be the still image data. When data of each frame are changed during the predetermined frame periods, the image data are determined to be the moving image data. When the image data are the still image data, the still image determining unit 172 may output a still image flag to notify that the image data are the still image data.

The driving frequency deciding unit 173 may decide the driving frequency by analyzing the image data when the image data are the still image data. The driving frequency deciding unit 173 may decide the driving frequency as the low frequency to reduce the power consumption, because data of each frame of the image data during the predetermined frame periods are the same data as each other when the image data are still image data. In a display device, when frequency of the image data is lower than a certain level, the flicker may occur. Therefore, in an exemplary embodiment, the driving frequency deciding unit 173 may decide the driving frequency within a range that is predetermined for flicker-free driving, e.g., a predetermined frequency range that allows the still image data to be displayed without flicker. In one exemplary embodiment, for example, the driving frequency deciding unit 173 may calculate grayscale of the image data, and decide the driving frequency corresponding to the grayscale using the flicker profile.

The frequency information providing unit 174 may provide the decided driving frequency as the driving frequency information to a frequency information receiving unit 210. The frequency information providing unit 174 may provide the decided driving frequency through various kinds of methods according to types of the processor 200A or the controller 170A. In one exemplary embodiment, for example, the driving frequency is provided from the frequency information providing unit 174 to the frequency information receiving unit 210 via a private channel, a mobile industry processor interface ("MiPi"), an AUX channel of the display port, etc. In one exemplary embodiment, for example, the frequency information providing unit 174 may provide the driving frequency to the frequency information receiving unit 210 when the driving frequency is changed. In one exemplary embodiment, for example, the frequency information providing unit 174 may recognize changing of the driving frequency determined by the driving frequency deciding unit 173, and provide the driving frequency to the frequency information receiving unit 210.

The timing controller 178 may generate control signals based on the image data, and provide the control signals to the data driving unit and the scan driving unit. To display the image, the timing controller 178 may provide a data signal, a horizontal start signal and a first clock signal to the data driving unit, and may provide a vertical start signal and a second clock signal to the scan driving unit. In such an embodiment, the timing controller 178 may not include the frame memory, thereby reducing manufacturing cost of display device and reducing the power consumption.

In an exemplary embodiment, as shown in FIG. 2, the processor 200A may include a frequency information receiving unit 210 and an image data transferring unit 240.

The frequency information receiving unit 210 may receive the driving frequency information based on the driving frequency from the frequency information providing unit 174 to adjust the frequency of the image data. The frequency information receiving unit 210 may receive the driving frequency as the driving frequency information from the frequency information providing unit 174 to adjust the frequency of the image data. In one exemplary embodiment, for example, the frequency information receiving unit 210 may periodically send a driving frequency providing request, that is, a request for providing a driving frequency, to the frequency information providing unit 174, and the frequency information providing unit 174 may provide the driving frequency to the frequency information receiving unit 210 in response to the driving frequency providing request. In one exemplary embodiment, for example, the frequency information receiving unit 210 may send the driving frequency providing request to the frequency information providing unit 174 every predetermined time period, e.g., hour, and check a change in the driving frequency.

The image data transferring unit 240 may adjust the frequency of the image data to the driving frequency, and transfer the image data with the driving frequency to the image data receiving unit 171. When the image data are still image data, the image data transferring unit 240 may adjust the frequency of the image data to the driving frequency that is a low frequency without the flicker. Herein, a low frequency means a predetermined frequency lower than the normal driving frequency, and a low frequency without the flicker means a low frequency that effectively prevents a viewer to recognize a flicker when the image data is displayed based thereon. Therefore, in such an embodiment, the image data transferring unit 240 transfers the image data with a low frequency, thereby reducing the power consumption and preventing the flicker.

Figure 3:
FIG. 3 is a graph showing an exemplary embodiment of a flicker profile to decide a driving frequency in the electronic device of FIG. 1.

FIG. 3 is a graph showing an exemplary embodiment of a flicker profile to decide a driving frequency in the electronic device of FIG. 1.

Referring to FIG. 3, a driving frequency of image data provided to the display device by processor may be decided using a flicker profile. The flicker profile may include driving frequencies corresponding to a grayscale of the image data to effectively prevent the flicker. Thus, the flicker profile may include information of minimum frequency with which the image data does not cause flicker. Therefore, the grayscale of the image data is calculated by analyzing the image data, and the driving frequency is derived from the flicker profile and the grayscale of the image data. In one exemplary embodiment, for example, when the image data has a first grayscale that is a relatively low grayscale, the driving frequency may have a first frequency that is relatively low. In such an embodiment, when the image data has a second grayscale that is a middle grayscale, the driving frequency may have a second frequency that is relatively high with respect to the first frequency.

The flicker profile may be differently set based on the display device, because characteristics of the display device are different by size or type of the display device. In an exemplary embodiment, the flicker profile may be stored in a memory of the display device. In one exemplary embodiment, the flicker profile may be stored in an erasable programmable read only memory ("EPROM") connected to the controller of the display device. In an exemplary embodiment, where the processor has no direct access to the flicker profile of the display device, the display device may provide the flicker profile or the driving frequency decided using the flicker profile to the processor for a low frequency driving.

Figure 4:
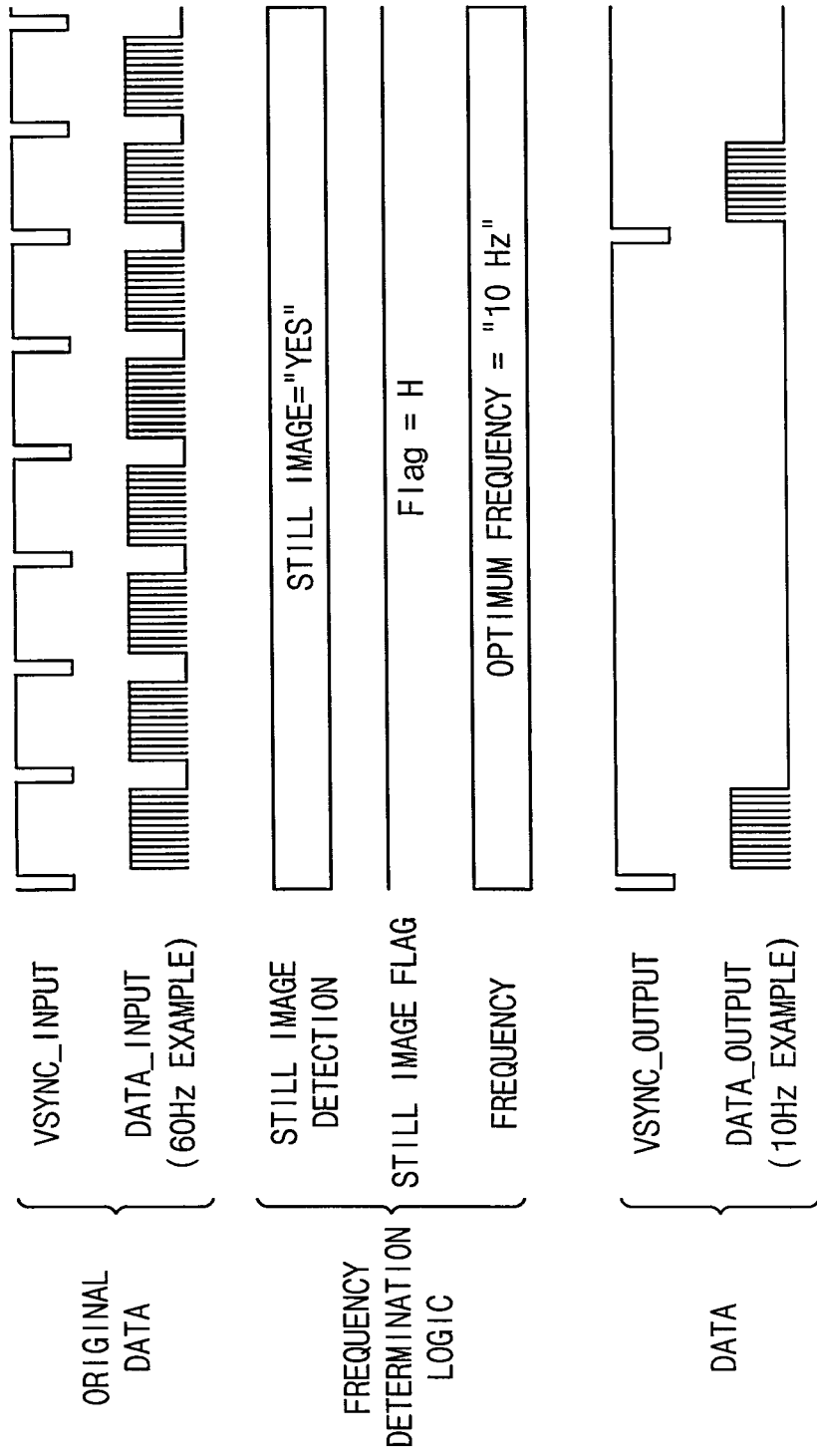
FIG. 4 is a diagram illustrating an exemplary embodiment of a low frequency driving between the processor and the display device of FIG. 2.

FIG. 4 is a diagram illustrating an exemplary embodiment of a low frequency driving between the processor and the display device of FIG. 2.

Referring to FIG. 4, in an exemplary embodiment, the image data transferring unit may adjust the frequency of the image data to the driving frequency by masking the image data.

In one exemplary embodiment, for example, frequency of original image data may be about 60 hertz (Hz). In such an embodiment, when the original image data are the still image data, a still image data flag is set to high. The driving frequency is decided or set as about 10 Hz corresponding to the grayscale of the original image data using the flicker profile. In such an embodiment, the output image data are generated by masking the original image data. Therefore, the processor may adjust the frequency of the output image data to the driving frequency lower than original frequency without using additional memory by masking the original image data.

Figure 5:
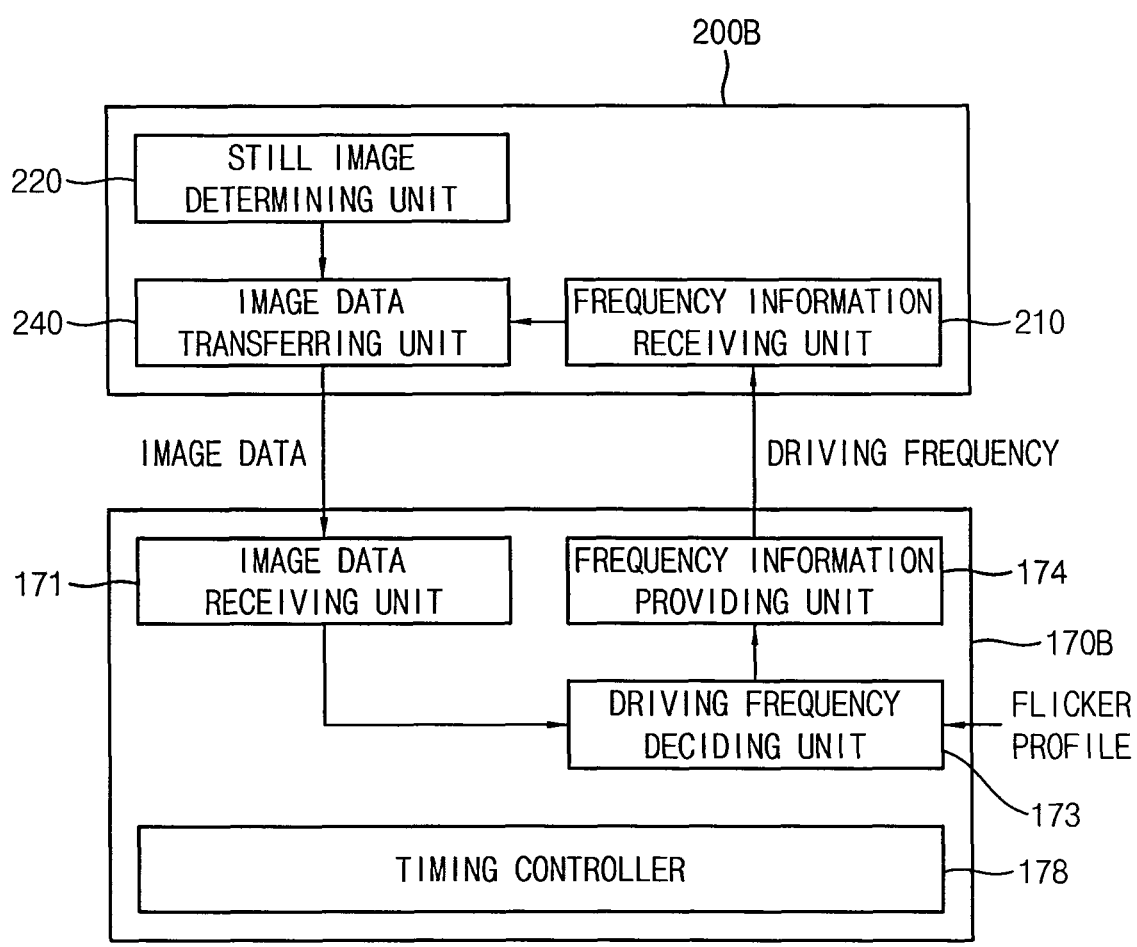
FIG. 5 is a block diagram illustrating another exemplary embodiment of a processor and a controller of a display device of the electronic device of FIG. 1.

FIG. 5 is a block diagram illustrating another exemplary embodiment of a processor and a controller of a display device of the electronic device of FIG. 1.

Referring to FIG. 5, in an exemplary embodiment, a controller 170B of the display device may provide the driving frequency to the processor 200B, such that the processor 200B may adjust a frequency of the image data based on the driving frequency.

The controller 170B may include an image data receiving unit 171, a driving frequency deciding unit 173, a frequency information providing unit 174 and a timing controller 178. The controller 170B of an exemplary embodiment as shown in FIG. 5 is substantially the same as the controller in an exemplary embodiment described above with reference to FIG. 2, except that the controller 170B does not include the still image determining unit. The same or like elements shown in FIG. 5 have been labeled with the same reference characters as used above to describe the controller in an exemplary embodiment as shown in FIG. 2, and any repetitive detailed description thereof will hereinafter be omitted or simplified.

The image data receiving unit 171 may receive the image data from an image data transferring unit 240. The image data receiving unit 171 may transfer the image data to the driving frequency deciding unit 173 to decide the driving frequency between the processor 200B and display device. In one exemplary embodiment, for example, when the still image flag of the image data is high, that is, when the image data are the still image data, the image data receiving unit 171 may transfer the image data to the driving frequency deciding unit 173.

The driving frequency deciding unit 173 may decide the driving frequency by analyzing the image data when the image data are the still image data.

The frequency information providing unit 174 may provide the decided driving frequency as the driving frequency information to a frequency information receiving unit 210.

The timing controller 178 may generate control signals based on the image data, and provide the control signals to the data driving unit and the scan driving unit.

The processor 200B may include a frequency information receiving unit 210, a still image determining unit 220 and an image data transferring unit 240. The processor 200B in an exemplary embodiment as shown in FIG. 5 is substantially the same as the processor of an exemplary embodiment described above with reference to FIG. 2, except that the still image determining unit 220 is added. The same or like elements shown in FIG. 5 have been labeled with the same reference characters as used above to describe the processor and the processor in an exemplary embodiment as shown in FIG. 2, and any repetitive detailed description thereof will hereinafter be omitted or simplified.

The frequency information receiving unit 210 may receive the driving frequency as the driving frequency information from the frequency information providing unit 174 to adjust the frequency of the image data. In one exemplary embodiment, for example, the frequency information receiving unit 210 may send a driving frequency providing request to check changing of the driving frequency.

The still image determining unit 220 may determine whether the image data are still image data. In one exemplary embodiment, for example, the still image determining unit 220 may analyze the frame data of the image data. In such an embodiment, when data of each frame are not changed during predetermined frame periods, then the image data are determined to be the still image data. In such an embodiment, when data of each frame are changed during the predetermined frame periods, the image data are determined to be the moving image data. When the image data are the still image data, the still image determining unit 172 may output a still image flag to notify that the image data are the still image data.

The image data transferring unit 240 may adjust the frequency of the image data to the driving frequency, and transfer the image data with the driving frequency to the image data receiving unit 171. When the image data are still image data, the image data transferring unit 240 may adjust the frequency of the image data to the driving frequency that is a low frequency without the flicker.

In an exemplary embodiment, as shown in FIG. 5, when the processor 200B includes the still image determining unit 220 to determine whether the image data are the still image data, load of the display device may be relieved, as the still image detection is performed in the processor 200B.

Figure 6:
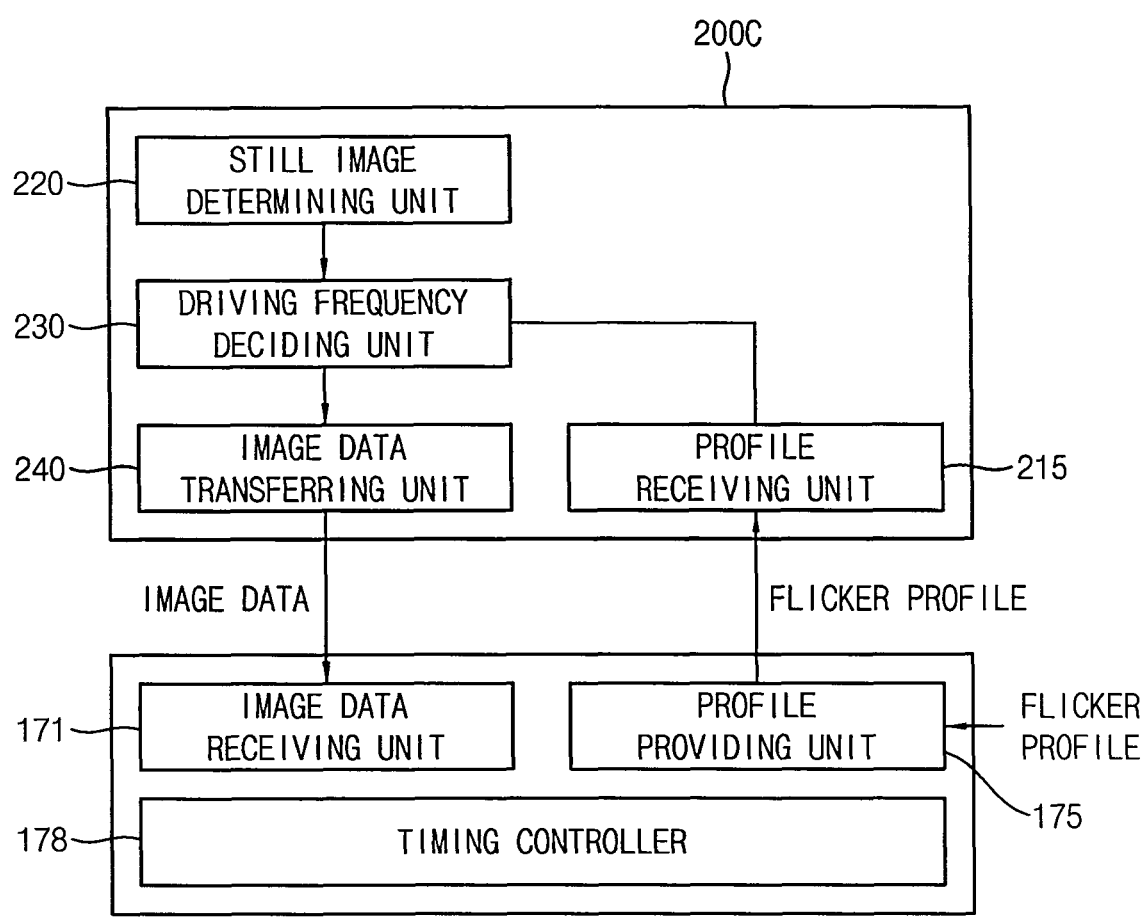
FIG. 6 is a block diagram illustrating still another exemplary embodiment of a processor and a controller of a display device of the electronic device of FIG. 1.

FIG. 6 is a block diagram illustrating still another exemplary embodiment of a processor and a controller of a display device of an electronic device of FIG. 1.

Referring to FIG. 6, in an exemplary embodiment, a controller 170C of the display device may provide the flicker profile to the processor 200C, such that the processor 200C may adjust a frequency of the image data based on the flicker profile.

The controller 170C may include an image data receiving unit 171, a profile providing unit 175 and a timing controller 178.

The image data receiving unit 171 may receive the image data from the processor 200C. The image data receiving unit 171 may transfer the image data to the timing controller 178 to provide control signals corresponding to the image data to the scan driving unit and the data driving unit.

In an exemplary embodiment, as shown in FIG. 6, the profile providing unit 175 may provide a flicker profile of the display device as the driving frequency information to a profile receiving unit 215. The flicker profile may be stored in the memory such as an EPROM connected to the profile providing unit 175. The profile providing unit 175 may provide the flicker profile to the profile receiving unit 215 through a method among various kinds of methods, which may be determined based on types of the processor 200C or the controller 170C. In one exemplary embodiment, for example, the flicker profile is provided from the profile providing unit 175 to the profile receiving unit 215 via a private channel, a MiPi, an AUX channel of the display port, etc. In one exemplary embodiment, for example, the profile providing unit 175 may provide the flicker profile as the driving frequency information to the profile receiving unit 215 when the electronic device or the display device is initialized. In an exemplary embodiment, where the flicker profile does not need to change, the profile providing unit 175 provides the flicker profile to the profile receiving unit 215 only when the electronic device or the display device is initialized, thereby reducing the load of the processor 200C and the display device.

The timing controller 178 may generate control signals based on the image data, and provide the control signals to the data driving unit and the scan driving unit. In such an embodiment, the timing controller 178 is substantially the same as the timing controller in the exemplary embodiments described above, and any repetitive detailed description thereof will be omitted.

The processor 200C may include a profile receiving unit 215, a still image determining unit 220, a driving frequency deciding unit 230 and an image data transferring unit 240.

The profile receiving unit 215 may receive the image data from the profile providing unit 175.

The still image determining unit 220 may determine whether the image data are still image data. In such an embodiment, the still image determining unit 220 is substantially the same as the still image determining unit in the exemplary embodiments described above, and any repetitive detailed description thereof will be omitted.

The driving frequency deciding unit 230 may calculate a grayscale of the image data when the image data are the still image data, and to decide the driving frequency corresponding to the grayscale of the image data using the flicker profile received from the profile receiving unit 215. The driving frequency deciding unit 230 may decide the driving frequency that is a low frequency to reduce the power consumption, because data of frames of the image data are substantially the same as each other when the image data are still image data. The driving frequency deciding unit 230 may decide the driving frequency within a range that is predetermined for flicker-free driving.

The image data transferring unit 240 may adjust the frequency of the image data to the driving frequency, and transfer the image data with the driving frequency to the image data receiving unit 171. When the image data are still image data, the image data transferring unit 240 may adjust the frequency of the image data to the driving frequency that is a low frequency without the flicker. Therefore, the image data transferring unit 240 transfers the image data with a low frequency, thereby reducing the power consumption and effectively preventing the flicker.

In an exemplary embodiment, as shown in FIG. 6, the processor 200C decides the driving frequency as low driving frequency, thereby reducing load of the display device. In such an embodiment, efficiency of the electronic device may be improved, by providing the flicker profile to the processor 200C from the display device at once.

Figure 7:
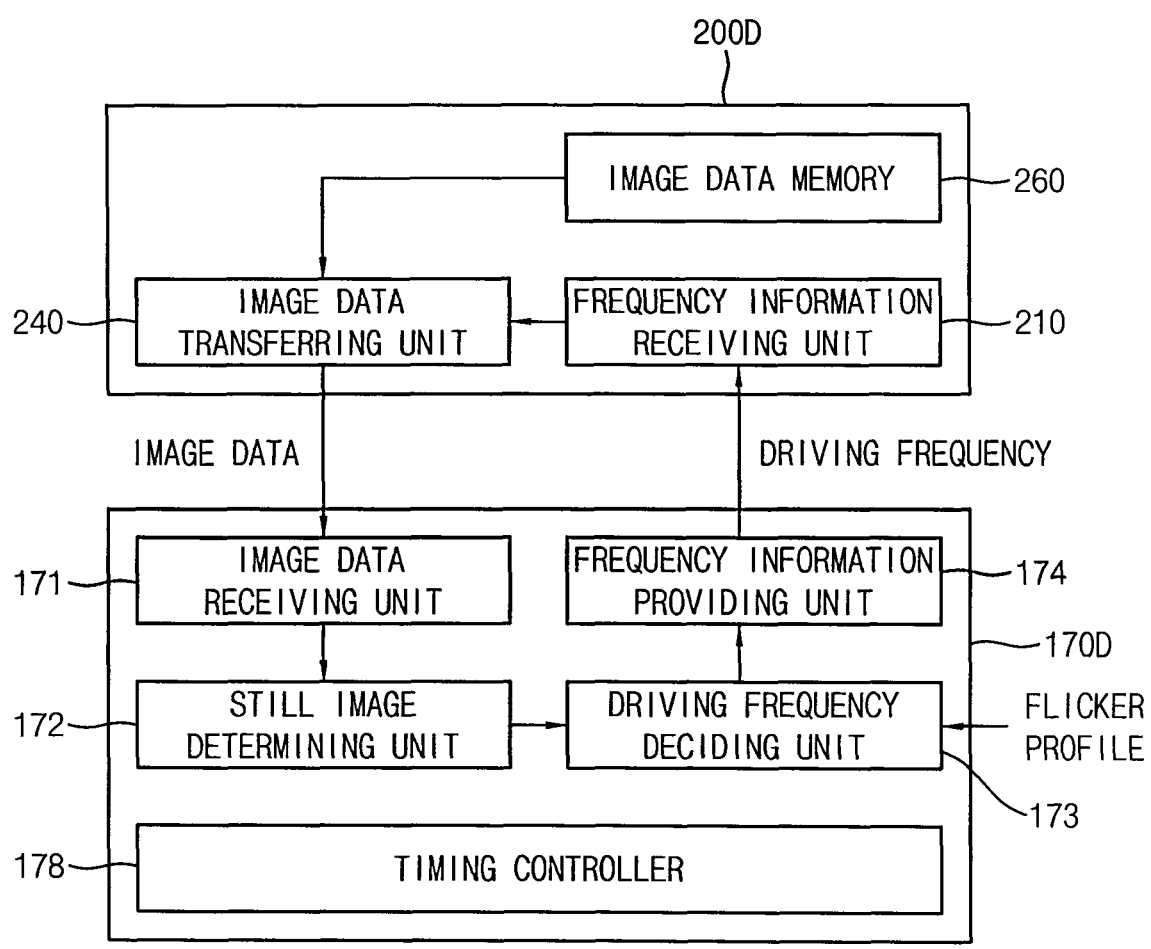
FIG. 7 is a block diagram illustrating still another exemplary embodiment of a processor and a controller of a display device of the electronic device of FIG. 1.
Figure 8:
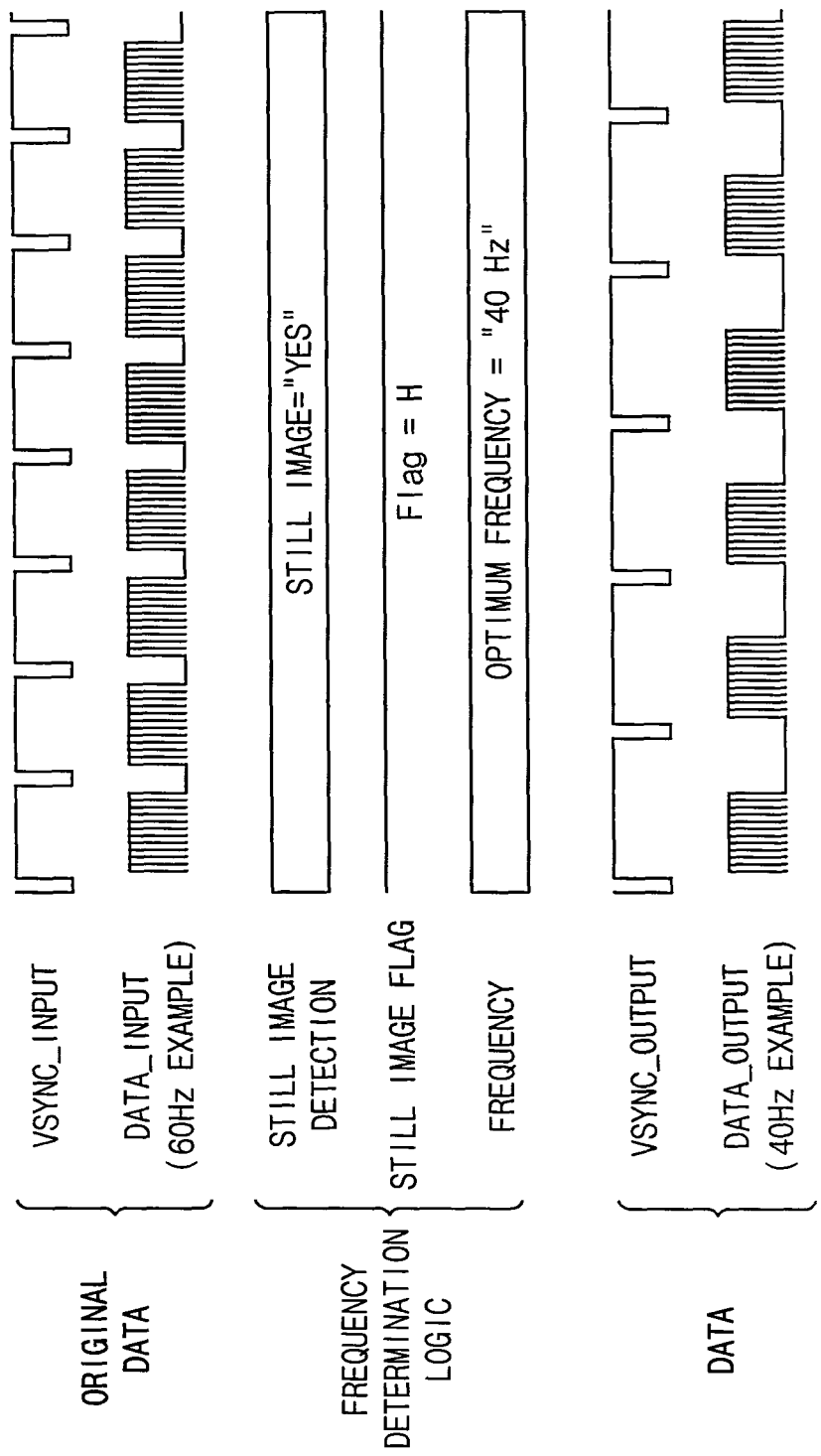
FIG. 8 is a diagram illustrating an exemplary embodiment of a low frequency driving between the processor and the display device of FIG. 7.

FIG. 7 is a block diagram illustrating still another exemplary embodiment of a processor and a controller of a display device of an electronic device of FIG. 1. FIG. 8 is a diagram illustrating an exemplary embodiment of a low frequency driving between the processor and the display device of FIG. 7.

Referring to FIGS. 7 and 8, in an exemplary embodiment, a processor 200D may include an image data memory 260, such that frequency of image data is adjusted to various driving frequencies in the processor 200D.

In such an embodiment, as shown in FIG. 7, the controller 170D of the display device may provide the driving frequency to the processor 200D, such that the processor 200D may adjust a frequency of the image data based on the driving frequency from the controller 170D.

The controller 170D may include an image data receiving unit 171, a still image determining unit 172, a driving frequency deciding unit 173, a frequency information providing unit 174 and a timing controller 178. The controller 170D of the exemplary embodiment shown in FIG. 7 is substantially the controller of the exemplary embodiments described above with reference to FIG. 2. Therefore, the same or like elements shown in FIG. 7 have been labeled with the same reference characters as used above to describe the controller of the exemplary embodiments shown in FIG. 3, and any repetitive detailed description thereof will hereinafter be omitted or simplified.

The processor 200D may include a frequency information receiving unit 210, an image data transferring unit 240 and the image data memory 260. The processor 200D of the exemplary embodiment shown in FIG. 7 is substantially the same as the processor of the exemplary embodiments described above with reference to FIG. 2, except for the image data memory 260. Therefore, the same or like elements shown in FIG. 7 have been labeled with the same reference characters as used above to describe the processor of the exemplary embodiments shown in FIG. 3, and any repetitive detailed description thereof will hereinafter be omitted or simplified.

The frequency information receiving unit 210 may receive the driving frequency information based on the driving frequency from the frequency information providing unit 174 to adjust the frequency of the image data.

The image data memory 260 stores the image data. The image data memory 260 may temporally store the image data to adjust the frequency of the image data to various driving frequencies. In one exemplary embodiment, for example, the image data memory 260 may be a nonvolatile memory such as flash memory, resistance random access memory ("RRAM"), nano floating gate memory ("NFGM"), polymer random access memory ("PoRAM"), magnetic random access memory ("MRAM"), and ferroelectric random access memory ("FRAM"). Also, the image data memory 260 may be a volatile memory such as dynamic random access memory ("DRAM"), static random access memory ("SRAM"), and mobile DRAM. In an exemplary embodiment, as shown in FIG. 7, the image data memory 260 is disposed in the processor 200D, but not being limited thereto. In an alternative exemplary embodiment, the image data memory 260 may be disposed outside of the processor 200D.

The image data transferring unit 240 may adjust the frequency of the image data to the driving frequency, and transfer the image data with the driving frequency to the image data receiving unit 171.

As shown in FIG. 8, the image data transferring unit 240 may adjust the frequency of the image data to the driving frequency using the image data stored in the image data memory 260.

In one exemplary embodiment, for example, frequency of original image data may be 60 Hz. When the original image data are the still image data, a still image data flag is set to high. The driving frequency may be decided or set as 40 Hz corresponding to the grayscale of the original image data using the flicker profile. In the processor of an exemplary embodiment shown in FIG. 2 that does not include the image data memory, frequency of output image data may not be adjusted to 40 Hz by masking the image data, because 40 Hz is not divisor of 60 Hz. Thus, in such an embodiment, when the frequency of the output image data is adjusted by the masking process, the frequency of the output image data only have frequencies that are divisors of the frequency of the original image data. In an alternative exemplary embodiment, as shown in FIG. 7, the processor 200D having the image data memory 260 may store the image data in the image data memory 260, thereby adjusting the frequency of the output image data to various frequencies using the image data stored in the image data memory 260.

Figure 9:
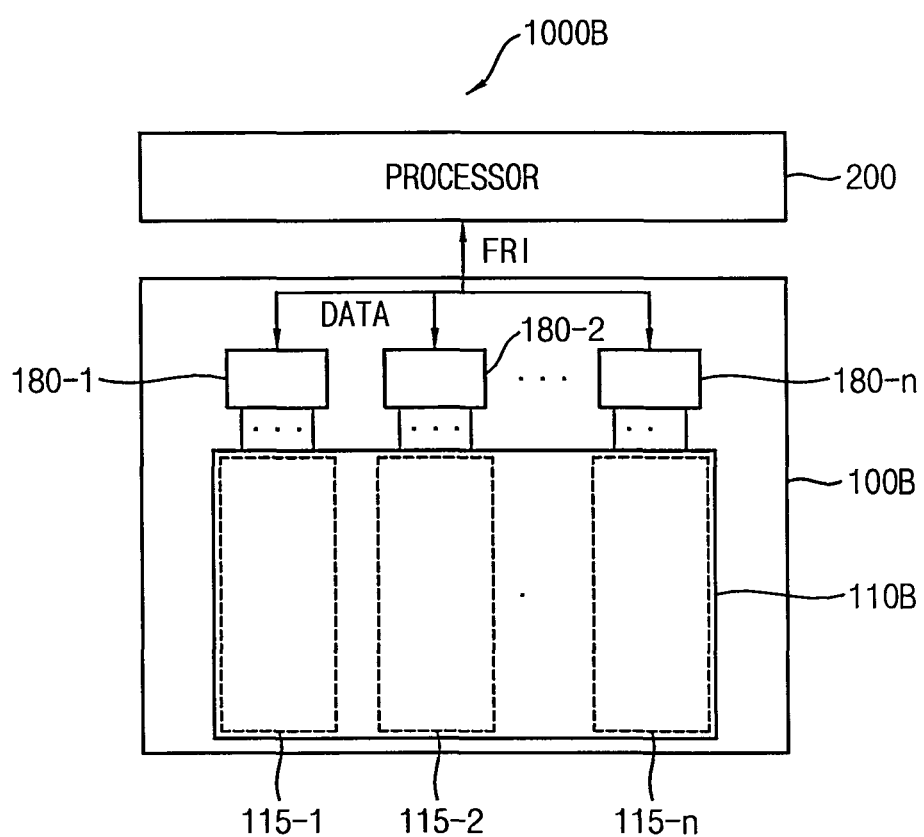
FIG. 9 is a block diagram illustrating another exemplary embodiment of an electronic device according to the invention.

FIG. 9 is a block diagram illustrating another exemplary embodiment of an electronic device according to the invention.

Referring to FIG. 9, in an exemplary embodiment, an electronic device 1000B may include a display device 100B and a processor 200.

The display device 100B may include a display panel 110B and a plurality of integration driving units 180-1 through 180-*n*.

The display panel 110B may include a plurality of pixels to display image corresponding to the image data DATA. The display panel 110B may include a plurality of display regions 115-1 through 115-*n*. Each of the display regions 115-1 through 115-*n* may be respectively coupled to the integration driving units 180-1 through 180-*n* via driving lines.

In an exemplary embodiment, each of the integration driving units 180-1 through 180-*n* may provide a driving frequency information FRI to the processor 200, and receive the image data DATA with the driving frequency determined based on the driving frequency information FRI from the processor 200. In such an embodiment, each of the integration driving units 180-1 through 180-*n* have a structure integrated controller and driving unit to provide control signals corresponding to the image data DATA to the pixels of the coupled display region. In one exemplary embodiment, for example, the first integration driving unit 180-1 may have a structure in which a controller and a data driving unit are integrated, and provide data signal, clock signal and start signal corresponding to the image data DATA, to the first display region 115-1.

In such an embodiment, the display device 100B may further include the scan driving unit or the power supply unit, for example.

The processor 200 may receive the driving frequency information FRI from each of the integration driving units 180-1 through 180-*n* and adjust frequency of the image data DATA based on the highest frequency among the frequencies corresponding to the driving frequency information FRI. Thus, the processor 200 may adjust the frequency of the image data DATA based on the highest frequency among the driving frequencies corresponding to the driving frequency information FRI to effectively prevent the flicker in the entire display panel 110B. In such an embodiment, the processor 200 may transfer the image data DATA with a low frequency to the display device 100B.

Figure 10:
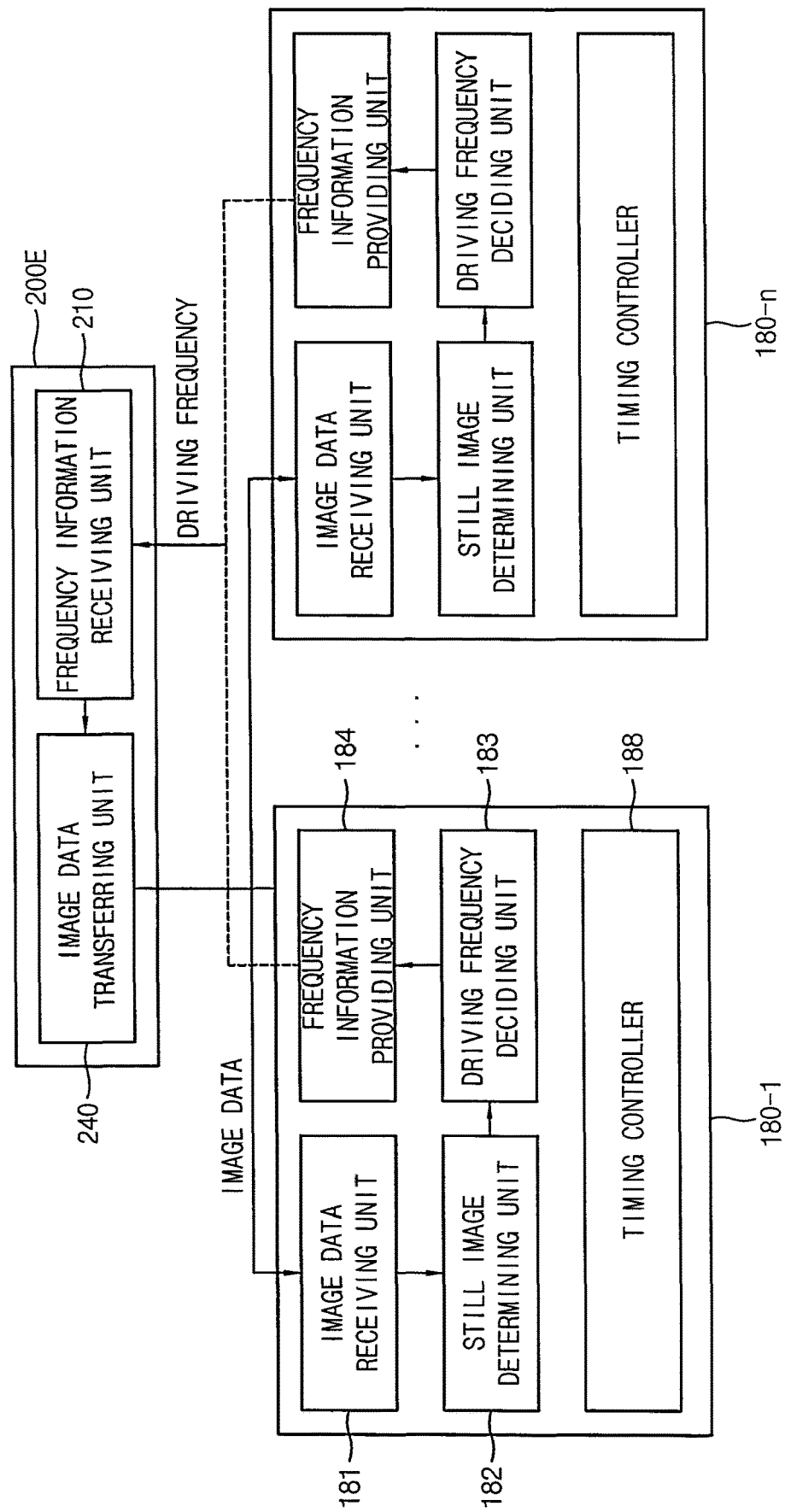
FIG. 10 is a block diagram illustrating an exemplary embodiment of a processor and an integration driving units of a display device of the electronic device of FIG. 9.

FIG. 10 is a block diagram illustrating an exemplary embodiment of a processor and an integration driving units of a display device of an electronic device of FIG. 9.

Referring to FIG. 10, in an exemplary embodiment, each of the integration driving units 180-1 through 180-*n* of the display device may provide the driving frequency to the processor 200E, such that the processor 200E may adjust a frequency of the image data based on the driving frequency from each of the integration driving units 180-1 through 180-*n*.

Each of the integration driving units 180-1 through 180-*n* may include an image data receiving unit 181, a still image determining unit 182, a driving frequency deciding unit 183, a frequency information providing unit 184 and a timing controller 188.

The image data receiving unit 181 may receive the image data from the processor 200E. The still image determining unit 182 may determine whether the image data from the processor 200E are still image data. The driving frequency deciding unit 183 may decide the driving frequency by analyzing the image data when the image data are the still image data. The frequency information providing unit 184 may provide the decided driving frequency as the driving frequency information to a frequency information receiving unit 210. The timing controller 188 may generate control signals based on the image data, and provide the control signals to the display panel.

The image data receiving unit 181, the still image determining unit 182, the driving frequency deciding unit 183, the frequency information providing unit 184, and the timing controller 188 of the exemplary embodiment shown in FIG. 10 are substantially the same as the still image determining unit, the driving frequency deciding unit, the frequency information providing unit and the timing controller of the exemplary embodiment described above with reference to FIG. 2, except that each of the integration driving units 180-1 through 180-*n* respectively calculate the driving frequencies and respectively provide the driving frequencies to the processor 200E.

The processor 200E may include a frequency information receiving unit 210 and an image data transferring unit 240.

The frequency information receiving unit 210 may receive the driving frequency information based on the driving frequencies from each the frequency information providing unit 184 of the integration driving units 180-1 through 180-*n* to adjust the frequency of the image data.

The image data transferring unit 240 may adjust the frequency of the image data to the driving frequency, and transfer the image data with the driving frequency to each the image data receiving unit 181 of the integration driving units 180-1 through 180-*n*. The image data transferring unit 240 may adjust the frequency of the image data based on the highest frequency among the driving frequencies received from the integration driving units 180-1 through 180-*n*. Thus, the image data transferring unit 240 may adjust the frequency of the image data based on the highest frequency among the driving frequencies corresponding to the driving frequency information FRI to effectively prevent the flicker in the entire display panel.

FIG. 11 is a flow chart illustrating an exemplary embodiment a method of operating an electronic device according to the invention.

Referring to FIG. 11, an exemplary embodiment of a method of operating an electronic device performs a low frequency driving between the processor and the display device by sharing the driving frequency information between the processor and the display device. Therefore, such an embodiment of the method of operating the electronic device may allow the electronic device to reduce the power consumption thereof and to effectively prevent the flicker.

In an exemplary embodiment, it is determined whether image data are still image data (S110). In one exemplary embodiment, for example, if data of each frame of the image data are not changed during predetermined frame periods, then the image data are determined to be the still image data. In such an embodiment, if data of each frame of the image data are changed during predetermined frame periods, then the image data are determined as the moving image data. In such an embodiment, the determining whether image data are still image data (S110) may be performed by the processor or the display device.

In such an embodiment, when the image data are the still image data, grayscale of the image data may be calculated (S120). In such an embodiment, the driving frequency corresponding to the grayscale may be decided using the flicker profile (S125). In such an embodiment, the driving frequency is determined as a low frequency to reduce the power consumption. However, in a display device, when the frequency of the image data is lower than a certain level, the flicker may occur. Therefore, in an exemplary embodiment, the driving frequency is decided or set as a frequency within a range that is predetermined for flicker-free driving. In an exemplary embodiment, the calculating the grayscale (S120) and the deciding the driving frequency (S125) may be performed by the processor or the display device. In such an embodiment, the flicker profile is provided from the display device to the processor in advance to perform the calculating the grayscale (S120) and the deciding the driving frequency (S125) by the processor.

The frequency of the image data may be adjusted to the driving frequency by the processor (S130). When the image data are the still image data, the processor may adjust the frequency of the image data to the driving frequency that is a low frequency. In one exemplary embodiment, for example, the driving frequency may be decided by the display device, the processor may receive the driving frequency from the display device and adjust the frequency of image data to the driving frequency lower than original frequency of the image data. In one exemplary embodiment, for example, the frequency of the image data may be adjusted to the driving frequency by masking the image data. In such an embodiment, the method of adjusting the frequency of the image data is substantially the same as the method in exemplary embodiments described above, and any repetitive detailed description thereof will be omitted.

In an exemplary embodiment, the processor may transfer the image data with the adjusted frequency to the display device (S140). The display device may display an image corresponding to the image data (S150).

Therefore, an exemplary embodiment of the method of operating the electronic device performs a low frequency driving between the processor and the display device using the flicker profile of the display device. In an exemplary embodiment, the method of operating the electronic device performs a low frequency driving without using a frame memory, thereby reducing manufacturing cost and reducing the power consumption.

Exemplary embodiments of the invention may be applied to an electronic device including the display device, e.g., a cellular phone, a smart phone, a smart pad, a personal digital assistant ("PDA"), etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments described therein, and that modifications to the exemplary embodiments described herein, as well as other exemplary embodiments, are intended to be included within the scope of the appended claims.

What is claimed is:

1. An electronic device comprising:
    a display device configured to receive image data from a processor, to receive a flicker profile from a memory, to determine a driving frequency by analyzing the image data using the flicker profile, to provide driving frequency information corresponding to the driving frequency to the processor, and to display an image corresponding to the image data;
    the memory connected to or included in the display device and configured to store the flicker profile, the memory being directly inaccessible to the processor; and
    the processor configured to receive the driving frequency information from the display device, to adjust a frequency of the image data to the driving frequency based on the driving frequency information, and to transmit the image data to the display device at the driving frequency.

2. The electronic device of claim 1, wherein the display device is configured to determine the driving frequency based a grayscale of the image data and the flicker profile.

3. The electronic device of claim 2, wherein the flicker profile includes information of minimum frequency with which the grayscale of the image data does not cause flicker.

4. The electronic device of claim 1, wherein the display device is configured to determine whether the image data are still image data.

5. The electronic device of claim 1, wherein the processor is configured to determine whether the image data are still image data.

6. The electronic device of claim 1, wherein the processor is configured to adjust the frequency of the image data to the driving frequency by masking the image data.

7. The electronic device of claim 1, wherein the processor is configured to adjust the frequency of the image data to the driving frequency by using the image data stored in an image data memory included in the processor.

8. The electronic device of claim 1, wherein the display device includes first to n-th display regions and first to n-th integration driving units for driving the first to n-th display regions, respectively,
    wherein the first to n-th integration driving units are configured to provide first to n-th driving frequencies corresponding to the driving frequency information to the processor, and
    wherein the processor is configured to adjust the frequency of the image data to a highest frequency among the first to n-th driving frequencies.

9. An electronic device comprising:
    a display device configured to receive image data from a processor, to receive a flicker profile from a memory, to transmit the flicker profile to the processor, and to display an image corresponding to the image data;
    the memory connected to or included in the display device and configured to store the flicker profile, the memory being directly inaccessible to the processor; and
    the processor configured to receive the flicker profile from the display device, to determine a driving frequency by analyzing the image data using the flicker profile, to adjust a frequency of the image data to the driving frequency, and to transmit the image data to the display device at the driving frequency.

10. The electronic device of claim 9, wherein the processor is configured to determine the driving frequency based a grayscale of the image data and the flicker profile.

11. The electronic device of claim 10, wherein the flicker profile includes information of minimum frequency with which the grayscale of the image data does not cause flicker.

12. The electronic device of claim 9, wherein the processor is configured to determine whether the image data are still image data.

13. The electronic device of claim 9, wherein the processor is configured to adjust the frequency of the image data to the driving frequency by masking the image data.

14. The electronic device of claim 9, wherein the processor is configured to adjust the frequency of the image data to the driving frequency by using the image data stored in an image data memory included in the processor.

15. The electronic device of claim 9, wherein the display device is configured to transmit the flicker profile to the processor when the electronic device or the display device is initialized.

\* \* \* \* \*